April 28, 1959  H. SOMMER  2,884,287
SUPPORT ARRANGEMENT
Filed Feb. 25, 1957  2 Sheets-Sheet 1
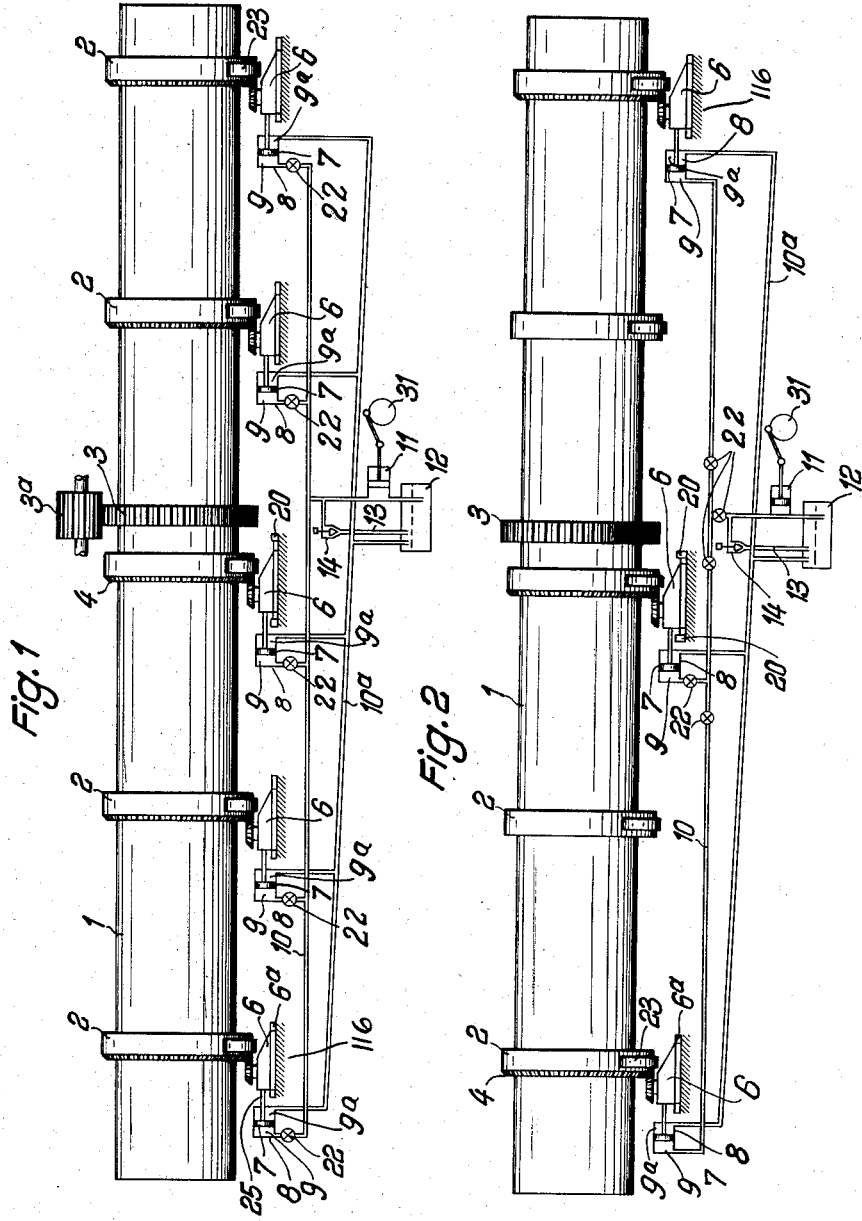
Inventor:
Hans Sommer
by Michael S. Striker
agt.

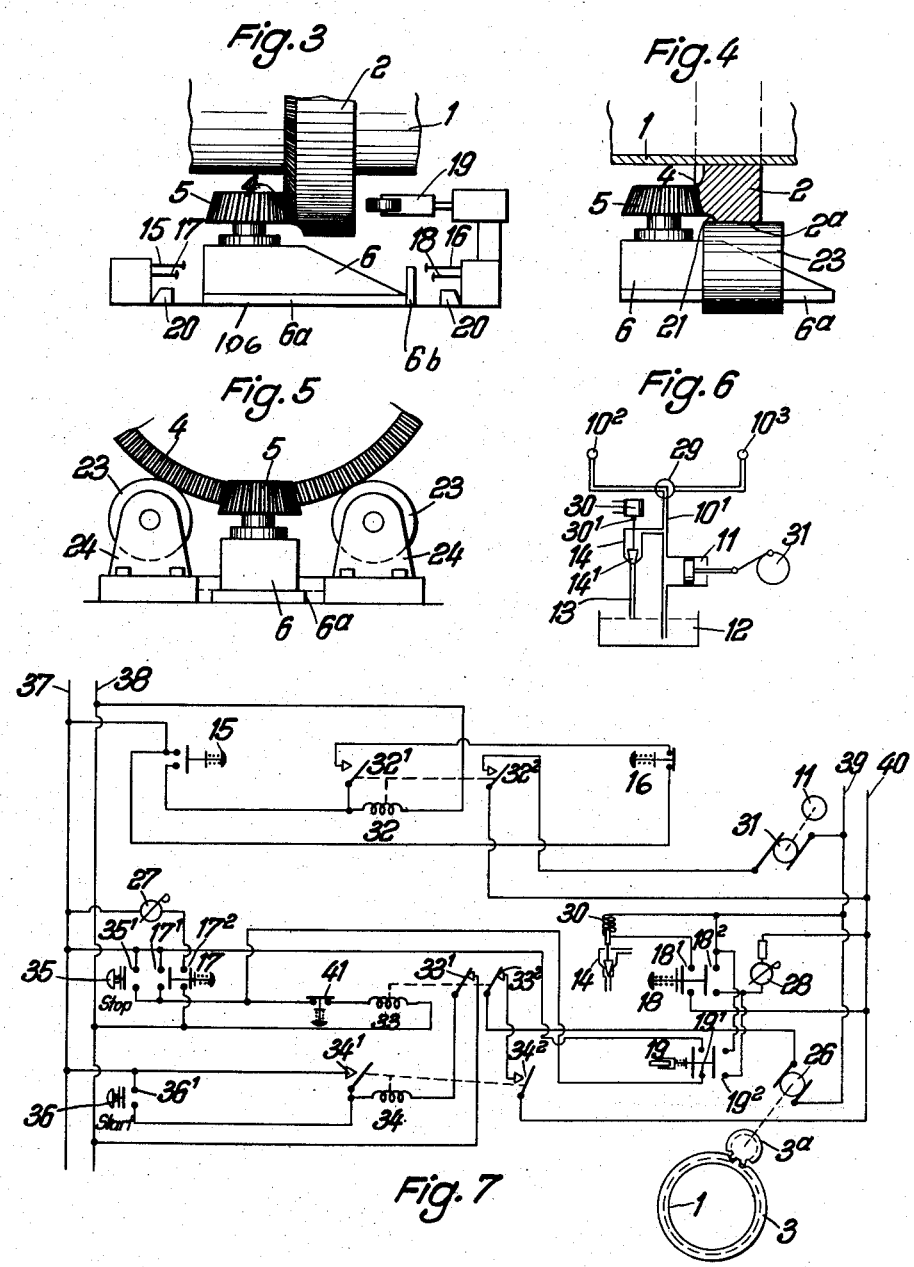

United States Patent Office 2,884,287
Patented Apr. 28, 1959

2,884,287

SUPPORT ARRANGEMENT

Hans Sommer, Ciment d'Obourg, Belgium, assignor to Firma Cementfabrik Holderbank-Wildegg A.G., Holderbank-Wildegg, Switzerland Application February 25, 1957, Serial No. 642,220

Claims priority, application Germany February 27, 1956

21 Claims. (Cl. 308—203)

The present invention relates to support arrangements for inclined rotary drums such as kilns, coolers, driers, mixers, or the like.

More particularly, the present invention relates to that improvement in such support arrangements which concerns itself with the taking up of axial forces that result from the inclination of the drum, i.e., the present invention concerns itself with structural components that absorb axially directed component of the weight of the body or drum for preventing substantial downward axial displacement thereof.

There exist several arrangements by means of which inclined rotary drums are supported. It has been found, however, that existing constructions are not suitable in the case of very large and heavy drums in which the axially directed component of the weight of the drum is of a very high order of magnitude.

It is therefore an object of the present invention to provide a support arrangement for inclined rotary bodies which is capable of being used in installations employing large and heavy rotary drums.

It is another object of the present invention to provide a support arrangement of the character described in which the rotary body engages a number of individual axially spaced abutments in such a manner that downward axial displacement is prevented, the construction being such that the ratio of the axially directed weight component portions absorbed by individual abutments is maintained substantially constant.

It is yet another object of the present invention to provide a support arrangement of the above described type in which the ratio of the axially directed weight component portions absorbed by the individual abutments is maintained substantially constant despite any expansion, contraction or axial displacement of the rotary body.

The objects of the present invention also include the provision of a support arrangement which will prevent axial displacement of an inclined rotary body, the support arrangement being of sturdy construction and being capable of being built at low cost.

With the above objects in view, the present invention mainly resides in that improvement in a support arrangement for an inclined rotary body which comprises at least two abutment means spaced from each other in the direction of the axis of the rotary body and arranged in such a manner that each abutment means absorbs a portion of the axially directed component of the weight of the body for preventing substantial downward axial displacement thereof, and means operatively associated with the two abutment means for maintaining substantially constant the ratio of the axially directed weight component portions absorbed by the two abutment means whereby the foundations of the abutment means are subjected to constant axial components of the weight of the rotary body regardless of deformations of the body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic elevational view of one embodiment of a support arrangement according to the present invention;

Fig. 2 is a diagrammatic elevational view of another embodiment of a support arrangement according to the present invention;

Fig. 3 is a fragmentary elevational view of a detail of the preesnt invention;

Fig. 4 is a fragmentary sectional view of a detail of the present invention;

Fig. 5 is an end view of the arrangement shown in Fig. 4;

Fig. 6 is a diagrammatic illustration of a fluid operated mechanism used in conjunction with a support arrangement according to the present invention; and Fig. 7 is a schematic diagram of an automatic control system used in conjunction with a support arrangement according to the present invention.

Referring now to the drawings and to Figs. 1, 3, 4 and 5 in particular, there is shown a rotary body 1 which may be in the form of a kiln drum. The drum carries five axially spaced mounting rings 2 which are rotatable with the drum, and each mounting ring 2 is supported by a pair of support rollers 23 each of which engages the outer peripheral surface 2a of the respective mounting ring and is carried by a bracket 24 for rotation about an axis parallel to that of the rotary drum. While in Fig. 1 each roller 23 has been illustrated as being somewhat shorter than its corresponding mounting ring 2, it has been found desirable to make each support roller 23 somewhat longer, as shown in Fig. 4, so that each support roller 23 will continue properly to support each mounting ring 2 despite some axial displacement of the drum 1.

The drum 1 may be rotated in any suitable manner, as, for example, by a gear ring 3 carried by the drum and in mesh with a driving pinion 3a which, in turn, is rotated by a motor 26 (Fig. 7).

The downwardly directed end face of each mounting ring is formed with a beveled surface 4 which is adapted to engage an abutment roller 5. Each abutment roller 5 is rotatable about an axis transverse to that of the rotary drum, and is carried by a carrier 6 which is mounted for movement in a direction parallel to the axis of rotation of the drum, suitable guiding means such as guide surfaces 6a being provided for this purpose. The guide faces 6a are provided on guide elements 106, which are respectively secured to separate foundations 116 which are located in a downwardly inclined plane so that the axis of the drum 1 is inclined. As may best be seen in Fig. 4, the peripheral surface 2a of each mounting ring 2 is not contiguous to the beveled end face 4, but is separated by an annular groove 21. As a result, any burrs or deformation occurring in the region one of the surfaces of the mounting ring 2 will not interfere with the other surface, so that any deformation of the surface 2a under the weight of the drum 1 will not interfere with the cooperation between the roller 5 and the surface 4.

If desired, the abutment roller 5 need not engage the same ring which engages the support rollers 23. Instead, the abutment rollers 5 may cooperate with rings or integral portions of the drum the sole function of which is to engage the rollers 5, so that in such arrangements the mounting rings 2 serve only to mount the drum 1 for rotation. Also, it may, under certain circumstances, not be necessary to provide abutments 5, 6 for each mounting ring. Thus, while in the arrangement shown in Fig. 1 a separate abutment 5, 6 is provided for each mounting ring 2, it may be sufficient to provide abutments 5, 6 for only some of the mounting rings 2, such as is shown in Fig. 2.

It will be seen from the above that each abutment 5, 6 absorbs a portion of the axially directed component of the weight of the body. In this way, any substantial downward axial displacement of the drum is presented. Suitable fluid pressure operated means are provided which not only maintain the axial position of the abutment means 5, 6 but which also maintain substantially constant the ratio of the axially directed weight component portions absorbed by the individual abutments. These means include a number of cylinder and piston units which cooperate with the individual abutments 5, 6, respectively. Each of the units includes a cylinder member 8 and a piston member 7 slidably arranged therewithin and dividing the cylinder member 8 into two cylinder chambers 9 and 9a. One of the members of each unit, preferably the cylinder member 8, is stationary and the other member, preferably the piston member 7, is movable with one of the carriers 6. Suitable conduit means 10 are provided for placing the pressure chambers 9 of the cylinder members 8 in communication with each other. These chambers and the conduit 10 are filled with a suitable fluid medium, such as oil, water or other liquid, or a gaseous medium. As a result, the individual abutment means 5, 6 are interconnected with each other in such a manner that the ratio of the axially directed weight component portions absorbed by the abutment means is automatically maintained substantially constant, despite any changes in the axial spacing between the mounting rings 2 due to expansion or contraction, or despite any axial displacement of the drum. Thus, the axial force acting on each foundation 116 is constant.

In the embodiment illustrated in Fig. 1, the effective cross-sections of the piston members 7 are equal to each other so that each abutment means absorbs the same portion of the axially directed component of the weight of the drum as each of the other abutment means. As a result, the foundation or bases carrying the individual abutment means will have the same axially directed weight component portions exerted upon them. It has been found, however, that the foundations carrying the several abutment means 5, 6 are not always of the same strength, i.e., that some foundations are stronger and therefore capable of having a greater force thrust on them than others. In the embodiment illustrated in Fig. 2 the central piston member 7 has a greater effective cross-section than either of the other two piston members. Such an installation is chosen where the particular foundation carrying the central abutment means 5, 6 is capable of withstanding greater forces than the other two individual foundations. In practice, therefore, the effective cross-sections of the piston members 7 is made proportional to the ratio of the axially directed weight component portions to be absorbed by the respective abutment means.

It will be seen from the above that the ratio of the axially directed weight component portion absorbed by the individual abutment means and foundations is maintained substantially constant simply by interconnecting with each other the pressure chambers 9 of the individual cylinder and piston units, i.e., those pressure chambers the volume of which tends to be reduced under the influence of the force absorbed by the respective abutment means. It has been found desirable, however, to provide a pumping device which maintains the pressure in the chambers 9, so that the device remains fully operative despite pressure losses due to leakage by way of the piston 7.

Such a pumping device may include a pump 11 driven by a motor 31. The suction or intake side of the pump is in communication with a fluid reservoir 12 and the pressure side of the pump is in communication with the conduit 10 which interconnects the pressure chambers 9. Additionally, the cylinder chambers 9a are interconnected by a conduit 10a which is also in communication with the reservoir 12, so that fluid passing from the pressure chambers 9 of any one of the cylinder and piston units can flow to the reservoir 12. Also, it has been found desirable to provide suitable valves 22 throughout the pressure system so that individual cylinder and piston units or even the pump can be isolated.

If desired, the single conduit 10 may be replaced by two conduits $10^2$ and $10^3$, each of these conduits communicating with the pressure chambers 9 of each cylinder. In such an arrangement the pressure conduit $10^1$ of the pump 11 is, as shown in Fig. 6, connected to a valve 29. Thus, the pressure fluid can be supplied to the pressure chambers 9 by way of either the conduit $10^2$ or the conduit $10^3$, so that in the event of damage to one of the conduits, the other may be used to assure the continued operation of the unit.

The above described construction may be used in conjunction with an arrangement for maintaining the axial position of the drum. Such an arrangement includes means operatively associated with at least one of the abutment means 5, 6 for automatically maintaining the same in substantially the same position. In this way, all of the individual abutment means, which are interconnected with each other in the manner described above, will serve to hold the drum in substantially the same axial position.

In order to accomplish this result, one of the abutment means 5, 6 carries a finger 6b and is utilized as a control unit which cooperates with a pair of switches 15, 16, arranged axially above and below the carrier 6. The switches are electrically connected to the pump motor 31 in such a manner when the carrier 6 has, as a result of pressure losses on the pressure chambers 9, moved downwardly a distance sufficient to actuate the switch 15, the motor 31 is energized, whereas when the carrier 6 has, as the result of a relatively high pressure in the pressure chambers 9, moved upwardly a distance sufficient to cause the finger 6b to actuate the switch 16, the motor 31 is disconnected.

Additionally, safety switches 17 and 18 are provided, the arrangement being such that the switch 17 can be actuated only after the switch 15 has been actuated, and that the switch 18 can be actuated only after the switch 16 has been actuated. The switch 17 is electrically connected to the driving motor 26 and also to an acoustic or optical warning device the construction being such that when the switch 17 is actuated the motor 26 is shut off and the warning signal actuated. The switch 18 serves to energize the solenoid 30 which attracts the armature $30^1$ of the valve member $14^1$ of the valve 14 so that the valve 14 is opened and the pressure fluid is short-circuited back to the reservoir 12. Additionally, the switch 18 also actuates an alarm device. In this way in the event the carrier 6 of the control unit moves upwardly a distance sufficiently great to actuate the switch 18, the same will render the pump ineffective, it being clear, however, that the switch 18 will be actuated only in the event of malfunction of the switch 16 or of the electric circuit incorporating the switch.

Additionally, a further safety switch 19 may be provided which is arranged in the path of the mounting ring 2. The switch 19 is electrically connected to the motor 26 in such a manner that in the event the drum, together with mounting ring 2, moves upwardly independently of the abutment means 5, 6, the switch 19 will be actuated in such a manner as to shut off the motor 26. Additionally, a suitable alarm device will be energized upon actuation of the switch 19. This prevents excessive axial displacement of the drum 1 so that there is no danger of axial displacement of the drum beyond a point where the mounting ring 2 will not be supported by the support rollers 23.

Additionally, stationary stops 20 are provided for preventing excess travel of the carrier 6.

The above described components are connected to each other as shown in Fig. 7 in which the elements 27 and 28 represent alarm devices, the elements 32, 33 and 34 represent relays, the elements 35 and 36 represent stop and start switches, respectively, and the elements 37, 38 and 39, 40 represent sources of electrical energy. In Fig. 7, the switches $32^1$ and $32^2$ of the relay 32, the switches $33^1$ and $33^2$ of the relay 33 and the switches $34^1$ and $34^2$ of the relay 34 are shown in the positions which the respective switches occupy when the corresponding relay winding is not energized. Thus, when the relay 32 is energized, the switches $32^1$ and $32^2$ will be closed, when the relay 33 is energized, the switches $33^1$ and $33^2$ will be open, and when the relay 34 is energized the switches $34^1$ and $32^2$ will be closed. Additionally, a normally closed switch 41 is arranged in series with the relay 33.

The operation of the above is as follows:

Rotation of the drum is commenced by pressing the start button 36. This bridges the contacts $36^1$ thereby energizing the relay 34. This will close the switches $34^1$ and $34^2$, the latter causing the motor 26 to be placed across the line 39, 40. Once the relay 34 has been energized, this condition will be maintained by the switch $34^1$, so that the motor 26 will continue to rotate after the start button has been released.

After a certain time, the carrier 6 of the control unit 5, 6 will be moved downwardly under the influence of the axially directed weight component absorbed by the abutment until the switch 15 is engaged and closed. This energized the relay 32, thereby closing the switches $32^1$ and $32^2$. The closing of the latter switch places the pump motor 31 across the line 39, 40, thereby causing the pump to increase the pressure in the pressure chambers 9. This, in turn, will cause the various carriers 6, including the carrier 6 of the control unit, to move upwardly, thereby releasing the switch 15. However, the relay 32 will remain energized by way of the switch $32^1$, so that the pump 11 will continue to maintain a pressure in the pressure chambers 9. In the event the pressure becomes too high, the finger 6b engages the switch 16 thereby opening the holding circuit of the relay 32.

Deenergization of the relay 32 causes opening of the switches $32^1$ and $32^2$, the latter stopping the pump motor 31. As a result, the pressure in the pressure chambers 9 will not be maintained by the pump 11, so that the carriers 6 will, after a certain amount of fluid has leaked to the cylinder chambers 9a, move downwardly until the carrier 6 of the control abutment means once again engages the switch 15 so that the above-described cycle is repeated.

In the event of malfunction of the switch 15 or if, for any other reason, the pump motor 31 is not energized when the carrier 6 engages the switch 15, the carrier 16 will continue its downward movement as the result of insufficient pressure within the pressure chambers 9. The carrier 6 will therefore engage the switch 17 thereby closing the contacts $17^1$ and $17^2$. Closing of the contacts $17^1$ energizes the relay 33, thereby opening the switches $33^1$ and $33^2$. Opening of the switch $33^2$ will deenergize the motor 26 so that rotation of the drum 1 is stopped.

Also, opening of the switch $33^1$ will have caused deenergization of the relay 34, thereby opening switches $34^1$ and $34^2$. At the same time, closing of the contacts $17^2$ will have energized the alarm device 27.

In the event of malfunction of the switch 16, the pump motor 31 will continue to drive the pump 11 so that the carrier 6 will continue to travel upwardly as a result of high pressure within the pressure chambers 9. The finger 6b will therefore actuate the switch 18, thereby closing the contacts $18^1$ and $18^2$. Closing of the contacts $18^1$ will energize the winding 30, thereby attracting the armature $30^1$ and raising the valve member $14^1$ of the valve 14. In this state, pressure fluid delivered by the pump 11 will be short-circuited back to the reservoir 12 so that no additional pressure is supplied to the pressure chambers 9. At the same time, closing of the contacts $18^2$ will have energized an alarm device 28.

In the event of malfunction of both the switches 16 and 18, or in the event that the drum 1 together with its mounting rings 2 moves upwardly independently of the abutment means 5, 6, the mounting ring 2 will engage and actuate the switch 19, thus closing contacts $19^1$ and $19^2$. Closing of the contacts $19^1$ will energize the relay 33, thereby opening the switches $33^2$ so that the motor 26 is stopped in the same manner as described above in connection with closing of the contacts $17^1$. At the same time, closing of the contacts $19^2$ will energize the alarm device 28.

Rotation of the drum 1 may be stopped at any time by pressing the stop button 35. This closes the contact $35^1$ thereby energizing the relay 33 so as to open the switches $33^1$ and $33^2$, thereby deenergizing the motor 26.

The normally closed switch 41 permits the relay 33 to be deenergized even though either of the switches 17 and 19 are in the closed positions, so that notwithstanding these conditions the drum motor 26 can be placed across the line 39, 40 and the drum 1 be rotated.

It will be seen from the above that normally movement of the carrier 6 of the control unit 5, 6 will be between those positions whereat the switches 15 and 16 are actuated. It will only be as a result of a malfunction of the pump motor circuit or of the fluid operated means which interconnect the various abutment means 5, 6 that the other switches and circuit components will be called upon to perform their respective functions.

It will be understood that each of the elements described above, or two or more together, may also find a useful application in other types of support arrangements differing from the types described above.

While the invention has been illustrated and described as embodied in a support arrangement for an inclined rotary drum, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a support arrangement for an inclined rotary elongated drum, in combination, at least two abutment means spaced from each other in the direction of the axis of said rotary elongated drum and arranged in such a manner that each abutment means absorbs a portion of the axially directed component of the weight of said elongated drum for preventing substantial downward axial displacement thereof; at least two separate foundations respectively supporting said abutment means in a downwardly inclined plane; and means operatively associated with said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

2. In a support arrangement for an inclined rotary elongated drum, in combination, at least two abutment means spaced from each other in the direction of the axis of said rotary elongated drum and arranged in such a manner that each abutment means absorbs a portion of the axially directed component of the weight of said elongated drum for preventing substantial downward axial displacement thereof; at least two separate foundations respectively supporting said abutment means in a downwardly inclined plane; and means interconnecting said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

3. In a support arrangement for an inclined rotary elongated drum, in combination, at least two abutment means spaced from each other in the direction of the axis of said rotary elongated drum and arranged in such a manner that each abutment means absorbs a portion of the axially directed component of the weight of said elongated drum for preventing substantial downward axial displacement thereof; at least two separate foundations respectively supporting said abutment means in a downwardly inclined plane; and fluid pressure operated means interconnecting said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

4. In a support arrangement for an inclined rotary elongated drum, in combination, at least two abutment means spaced from each other in the direction of the axis of said rotary elongated drum and arranged in such a manner that each abutment means absorbs a portion of the axially directed component of the weight of said elongated drum for preventing substantial downward axial displacement thereof; at least two separate foundations respectively supporting said abutment means in a downwardly inclined plane; and hydraulic means interconnecting said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

5. In a support arrangement for an inclined rotary elongated drum, in combination, at least two abutment means spaced from each other in the direction of the axis of said rotary elongated drum and arranged in such a manner that each abutment means normally absorbs an equal portion of the axially directed component of the weight of said elongated drum for preventing substantial downward axial displacement thereof; at least two separate foundations respectively supporting said abutment means in a downwardly inclined plane; and fluid pressure operated means interconnecting said two abutment means for maintaining substantially equal to each other the axially directed weight component portions absorbed by said two abutment means whereby constant axially directed weight component portions act on each of said foundations regardless of longitudinal deformation of said drum and of the amount and distribution of a load in said drum.

6. In a support arrangement for an inclined rotary elongated drum, in combination, at least two abutment means spaced from each other in the direction of the axis of said rotary elongated drum and arranged in such a manner that each abutment means normally absorbs a different portion of the axially directed component of the weight of said elongated drum for preventing substantial downward axial displacement thereof; at least two separate foundations respectively supporting said abutment means in a downwardly inclined plane; and fluid pressure operated means interconnecting said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

7. In a support arrangement for an inclined rotary body, in combination, at least two abutment means spaced from each other in the direction of the axis of said rotary body and arranged in such a manner that each abutment means absorbs a portion of the axially directed component of the weight of said body for preventing substantial downward axial displacement thereof, each of said abutment means being mounted for movement in said direction; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin, one of said members of each unit being stationary and the other of said members being movable with one of said abutment means, said fluid pressure operated means further including conduit means placing said cylinder members of said units in communication with each other.

8. In a support arrangement for an inclined rotary body, in combination, at least two abutment means spaced from each other in the direction of the axis of said rotary body and arranged in such a manner that each abutment means absorbs a portion of the axially directed component of the weight of said body for preventing substantial downward axial displacement thereof, each of said abutment means being mounted for movement in said direction; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin and dividing said cylinder member into two pressure chambers, one of said members of each unit being stationary and the other of said members being movable with one of said abutment means, said fluid pressure operated means further including conduit means placing corresponding pressure chambers of said cylinder members of said units in communication with each other.

9. In a support arrangement for an inclined rotary body, in combination, at least two abutment means spaced from each other in the direction of the axis of said rotary body and arranged in such a manner that each abutment means absorbs a portion of the axially directed component of the weight of said body for preventing substantially downward axial displacement thereof, each of said abutment means being mounted for movement in said direction; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin and dividing said cylinder member into two pressure chambers, one of said members of each unit being stationary and the other of said members being movable with one of said abutment means, said fluid pressure operated means further including conduit means placing corresponding pressure chambers of said cylinder members of said units in communication with each other and pumping means in communication with said conduit means for maintaining the pressure in those pressure chambers the volume of which tends to be reduced under the influence of the force absorbed by the respective abutment means.

10. In a support arrangement for an inclined rotary body, in combination, at least two abutment means spaced from each other in the direction of the axis of said rotary body and arranged in such a manner that each abutment means normally absorbs an equal portion of the axially directed component of the weight of said body for preventing substantial downward axial displacement thereof, each of said abutment means being mounted for movement in said direction; and fluid pressure operated means interconnecting said two abutment means for maintaining substantially equal to each other the axially directed weight component portions absorbed by said two abutment means, said fluid pressure operated means including at least two cylinder and piston units each of which includes a cylinder member and a piston member slidably arranged therewithin and dividing said cylinder member into two pressure chambers, the effective cross-sections of the piston members of each of said units being equal to each other, one of said members of each unit being stationary and the other of said members being movable with one of said abutment means, said fluid pressure operated means further including conduit means placing corresponding pressure chambers of said cylinder members of said units in communication with each other.

11. In a support arrangement for an inclined rotary body, in combination, at least two abutment means spaced from each other in the direction of the axis of said rotary body and arranged in such a manner that each abutment means normally absorbs a different portion of the axially directed component of the weight of said body for preventing substantial downward axial displacement thereof, each of said abutment means being mounted for movement in said direction; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin and dividing said cylinder member into two pressure chambers, the effective cross-sections of the piston members of said units being proportional to the ratio of the axially directed weight component portions to be absorbed by the respective abutment means, one of said members of each unit being stationary and the other of said members being movable with one of said abutment means, said fluid pressure operated means further including conduit means placing corresponding pressure chambers of said cylinder members of said units in communication with each other.

12. In a support arrangement for an inclined rotary body, in combination, at least two abutment means spaced from each other in the direction of the axis of said rotary body and arranged in such a manner that each abutment means absorbs a portion of the axially directed component of the weight of said body for preventing substantial downward axial displacement thereof, each of said abutment means being mounted for movement in said direction and including a roller rotatable about an axis transverse to that of said rotary body and adapted to cooperate with a mounting ring or the like encompassing said body and rotatable therewith; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin, one of said members of each unit being stationary and the other of said members being movable with one of said abutment means, said fluid pressure operated means further including conduit means placing said cylinder members of said units in communication with each other.

13. A support arrangement for an inclined rotary elongated drum, comprising, in combination, supporting means for rotatably supporting said elongated drum at at least two axially spaced points; at least two abutment means arranged at said points, respectively, in such a manner that each abutment means absorbs a portion of the axially directed component of the weight of said elongated drum for preventing substantial downward axial displacement of said body; at least two separate foundations respectively supporting said abutment means in a downwardly inclined plane; and means operatively associated with said two abutment means for maintaining substantially constant the ratio between the axially directed weight component portions absorbed by said two abutment means whereby constant axially directed weight component portions act on each of said foundations regardless of longitudinal deformation of said drum and of the amount and distribution of a load in said drum.

14. A support arrangement for an inclined rotary body, comprising, in combination, supporting means for rotatably supporting said body at at least two axially spaced points, said supporting means including at least two axially spaced mounting rings encompassing said body at said points, respectively, and rotatable with said body, said supporting means further including at least two pairs of parallel support rollers each of which is rotatable about an axis parallel to that of said body, the support rollers of each of said pairs engaging the peripheral surface of one of said mounting rings, respectively, thereby supporting the same; at least two abutment means arranged at said points, respectively, in such a manner that each abutment means absorbs the axially directed component of that portion of the weight of said body which is supported by the pair of support rollers at the respective point for preventing substantial downward axial displacement of said body, each of said abutment means being mounted for movement in the direction of the axis of rotation of said body and including an abutment roller rotatable about an axis transverse to that of said rotary body and adapted to be engaged by the downwardly directed end face of the respective mounting ring; and fluid pressure operated means interconnecting said two abutment means for maintaining substantially constant the ratio between the axially directed weight component portions absorbed by said two abutment means.

15. A support arrangement for an inclined rotary body, comprising, in combination, supporting means for rotatably supporting said body at a plurality of axially spaced points, said supporting means including a plurality of axially spaced mounting rings encompassing said body at said points, respectively, and rotatable with said body, said supporting means further including a plurality of pairs of parallel support rollers each of which is rotatable about an axis parallel to that of said body, the support rollers of each of said pairs engaging the peripheral surface of one of said mounting rings, respectively, thereby supporting the same; a plurality of abutment means equal in number to the number of mounting rings and arranged at said points, respectively, in such a manner that each abutment means absorbs the axially directed component of the weight of said body which is supported by the pair of support rollers at the respective point for preventing substantial downward axial displacement of said body, each of said abutment means being mounted for movement in the direction of the axis of rotation of said body and including an abutment roller rotatable about an axis transverse to that of said rotary body and adapted to be engaged by the downwardly directed end face of the respective mounting ring; and fluid pressure operated means interconnecting said plurality of abutment means for maintaining substantially constant the ratio between the axially directed weight component portions absorbed by said plurality of abutment means.

16. A method of distributing the axially directed component of the weight of an inclined rotary drum over at least two foundations, comprising the step of arranging abutments at at least two points spaced from each other in the direction of the axis of said rotary body in such a manner that each abutment absorbs a portion of the axially directed component of the weight of said rotary drum while maintaining substantially constant the ratio between the axially directed weight component portions absorbed by the two abutments whereby constant axially directed weight component portions act on each of said foundations regardless of longitudinal deformation of said drum and of the amount and distribution of a load in said drum.

17. In an arrangement for maintaining the axial position of an inclined rotary elongated drum, in combination, at least two abutment means spaced from each other in the direction of the axis of said rotary elongated drum; at least two separate foundations respectively supporting said abutment means, each abutment means being mounted on the associated foundation for movement in said direction and being adapted to absorb a portion of the axially directed component of the weight of said rotary elongated drum; and means operatively associated with said two abutment means for automatically maintaining the same in substantially the same position whereby constant axially directed weight component portions act on each of said foundations regardless of longitudinal deformation of said drum and of the amount and distribution of a load in said drum.

18. In an arrangement for maintaining the axial position of an inclined rotary elongated drum, in combination, at least two abutment means spaced from each other in the direction of the axis of said rotary elongated drum; at least two separate foundations respectively supporting said abutment means, each abutment means being mounted on the associated foundation for movement in said direction and being adapted to absorb a portion of the axially directed component of the weight of said rotary body; means operatively associated with said two abutment means for automatically maintaining the same in substantially the same position; and additional means interconnecting said two abutment means for maintaining substantially constant the ratio of the axially directed weight component portions absorbed by said two abutment means whereby constant axially directed weight component portions act on each of said foundations regardless of longitudinal deformation of said drum and of the amount and distribution of a load in said drum.

19. In a support arrangement for an inclined rotary elongated drum, in combination, at least two abutment means spaced from each other in the direction of the axis of said rotary elongated drum and arranged in such a manner that each abutment means absorbs a portion of the axially directed component of the weight of said elongated drum for preventing substantial downward axial displacement thereof, each of said abutment means being mounted for movement in said direction; at least two separate foundations respectively supporting said abutment means in a downwardly inclined plane; and fluid pressure operated means interconnecting said two abutment means for maintaining substantially constant the ratio of the axially directed weight component portions absorbed by said two abutment means, said fluid pressure operated means including at least two cylinder and piston units each of which includes a cylinder member and a piston member slidably arranged therewithin, one of said members of each unit being stationary and the other of said members being movable with one of said abutment means, said fluid pressure operated means further including conduit means placing said cylinder members of said units in communication with each other whereby constant axially directed weight component portions act on each of said foundations regardless of longitudinal deformation of said drum and of the amount and distribution of a load in said drum.

20. A support arrangement for an inclined rotary elongated drum, comprising, in combination, supporting means for rotatably supporting said elongated drum at at least two axially spaced points, said supporting means including at least two axially spaced mounting rings encompassing said elongated drum, said supporting means further including at least two pairs of parallel support rollers each of which is rotatable about an axis parallel to that of said elongated drum, the support rollers of each of said pairs engaging the peripheral surface of one of said mounting rings, respectively, thereby supporting the same; at least two abutment means arranged at said points, respectively, in such a manner that each abutment means absorbs the axially directed component of that portion of the weight of said elongated drum which is supported by the pair of support rollers at the respective point for preventing substantial downward axial displacement of said elongated drum, each of said abutment means being mounted for movement in the direction of the axis of rotation of said elongated drum and including an abutment roller rotatable about an axis transverse to that of said rotary elongated drum and adapted to be engaged by the downwardly directed end face of the respective mounting ring; at least two separate foundations respectively supporting said abutment means in a downwardly inclined plane; and fluid pressure operated means interconnecting said two abutment means for maintaining substantially constant the ratio between the axially directed weight component portions absorbed by said two abutment means whereby constant axially directed weight component portions act on each of said foundations regardless of longitudinal deformation of said drum and of the amount and distribution of a load in said drum.

21. A support arrangement for an inclined rotary elongated drum, comprising, in combination, supporting means for rotatably supporting said elongated drum at at least two axially spaced points, said supporting means including at least two axially spaced mounting rings encompassing said elongated drum at said points, respectively, and rotatable with said elongated drum, said supporting means further including at least two pairs of parallel support rollers each of which is rotatable about an axis parallel to that of said elongated drum, the support rollers of each of said pairs engaging the peripheral surface of one of said mounting rings, respectively, thereby supporting the same; at least two abutment means arranged at said points, respectively, in such a manner that each abutment means absorbs the axially directed component of that portion of the weight of said elongated drum which is supported by the pair of support rollers at the respective point for preventing substantial downward axial displacement of said elongated drum, each of said abutment means being mounted for movement in the direction of the axis of rotation of said elongated drum and including an abutment roller rotatable about an axis transverse to that of said rotary elongated drum and adapted to be engaged by the downwardly directed end face of the respective mounting ring; at least two separate foundations respectively supporting said abutment means in a downward inclined plane; and means interconnecting said two abutment means for maintaining substantially constant the ratio between the axially directed weight component portions absorbed by said two abutment means whereby constant axially directed weight component portions act on each of said foundations regardless of longitudinal deformation of said drum and of the amount and distribution of a load in said drum.

References Cited in the file of this patent

UNITED STATES PATENTS

| | | |
|---|---|---|
| 1,421,082 | Hall | June 27, 1922 |
| 1,925,875 | McLaughlin et al. | Sept. 5, 1933 |
| 1,956,648 | Messinger | May 1, 1934 |
| 2,229,530 | South | Jan. 21, 1941 |